United States Patent [19]

Larsson

[11] Patent Number: 4,602,178
[45] Date of Patent: Jul. 22, 1986

[54] ELECTRIC ROTATING DEVICE

[75] Inventor: Nils F. Larsson, Spanga, Sweden

[73] Assignee: AB Electrolux, Stockholm, Sweden

[21] Appl. No.: 713,104

[22] Filed: Mar. 18, 1985

Related U.S. Application Data

[63] Continuation of Ser. No. 490,296, May 2, 1983, abandoned, which is a continuation-in-part of Ser. No. 240,932, Mar. 5, 1981.

[51] Int. Cl.$^4$ ............................................. H02K 11/00
[52] U.S. Cl. ...................................................... 310/71
[58] Field of Search ...................................... 310/71, 68

[56] References Cited

U.S. PATENT DOCUMENTS

| | | | |
|---|---|---|---|
| 3,293,463 | 12/1966 | Church | 310/71 |
| 3,304,447 | 2/1967 | Lindt | 310/71 |
| 3,725,707 | 4/1973 | Leimbach et al. | 310/71 |
| 3,748,511 | 7/1973 | Crabb | 310/71 |
| 3,748,512 | 7/1973 | Crabb et al. | 310/71 |
| 3,974,407 | 8/1976 | Dochterman | 310/71 |
| 4,038,573 | 7/1977 | Hillyer et al. | 310/71 |
| 4,132,460 | 1/1979 | Ports | 310/71 X |
| 4,318,022 | 3/1982 | Miller | 310/71 X |
| 4,359,657 | 11/1982 | Matsumoto et al. | 310/71 X |

Primary Examiner—Donovan F. Duggan
Attorney, Agent, or Firm—Alfred E. Miller

[57] ABSTRACT

An electric rotating device, such as a commutator motor is provided with a stator supporting two terminal blocks of electrically insulating material. The terminal blocks are provided with a series of grooves in which wire ends of the stator windings are inserted. At least one of the grooves has an entrance part in the form of a slit and being defined by a resilient tongue having rounded edges. The tongue and the adjacent winding form a V-shaped entrance opening leading to the entrance part of the groove. The wire ends of the windings are guided by the grooves to terminal pins to which they are connected.

17 Claims, 7 Drawing Figures

ELECTRIC ROTATING DEVICE

This application is a continuation, of application Ser. No. 490,296, filed May 2, 1983 now abandoned which was a continuation-in-part of application Ser. No. 240,932 filed Mar. 5, 1981.

The present invention relates to an electric machine, for example, a small electric motor.

In manufacturing small electric motors, particularly commutator motors, it is desirable that the assembly of the motor be performed completely automatically. Up to the present, this has not been possible due to the fact that the termination of the stator wire ends had to be carried out manually. The termination process included the steps of removing insulation (insulating varnish), applying an insulating hose, and soldering and fixing of wires, and all of the foregoing steps are time-consuming.

An object of the present invention is to reduce the manual working steps of part of the process of assembling an electric rotating machine of the type specified. In this connection it is considered to be desirable that after completion of the stator windings, which have been machine wound directly on the stator core, the wire ends of the windings in an automatic process be conveyed and connected to pins constituting parts of terminal blocks.

This application is a continuation-in-part of copending U.S. patent application Ser. No. 240,932, filed on Mar. 5, 1981.

In order that the invention will be more clearly understood, it will now be disclosed in greater detail with reference to the accompanying drawings, in which.

Figure 1:
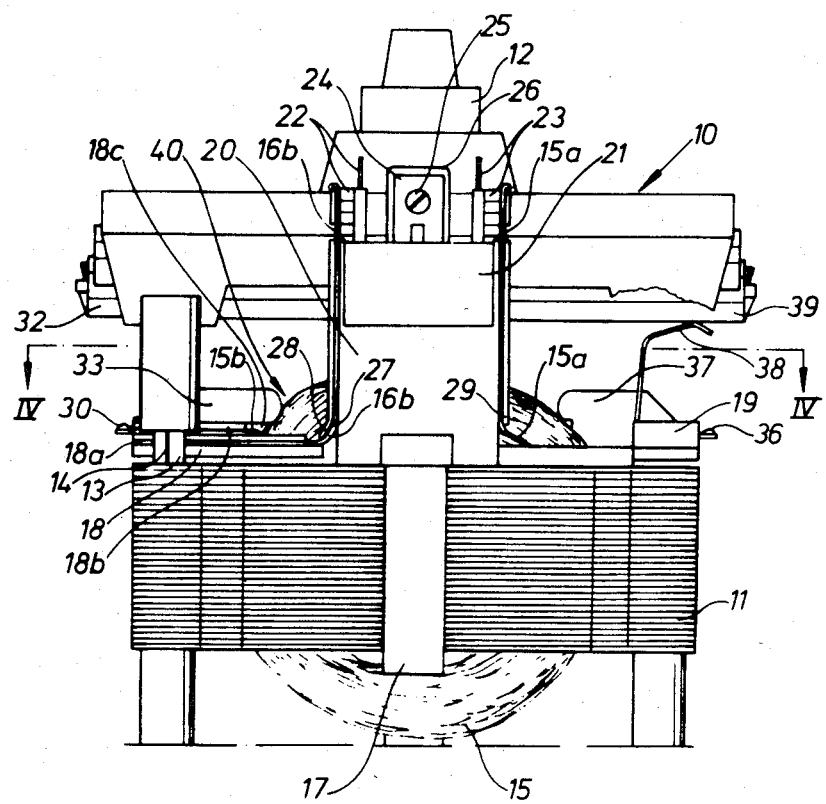
FIG. 1 is a front elevational view of an electric rotating device constructed in accordance with the teachings of the invention.
Figure 5A:
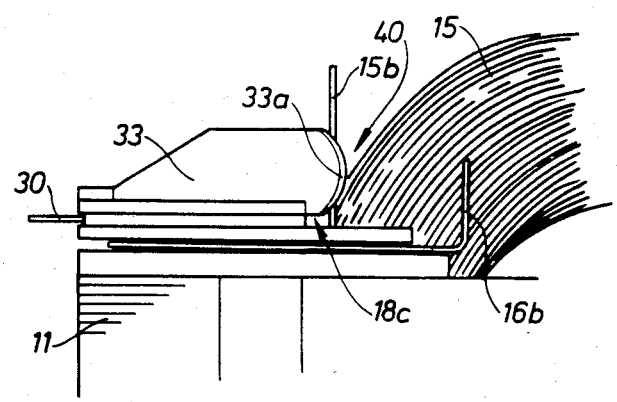
Figure 5B:
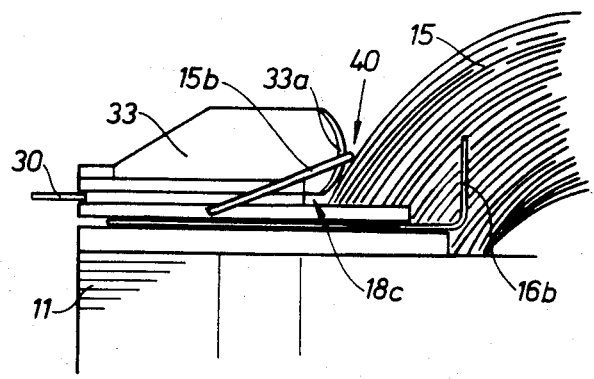
Figure 5C:
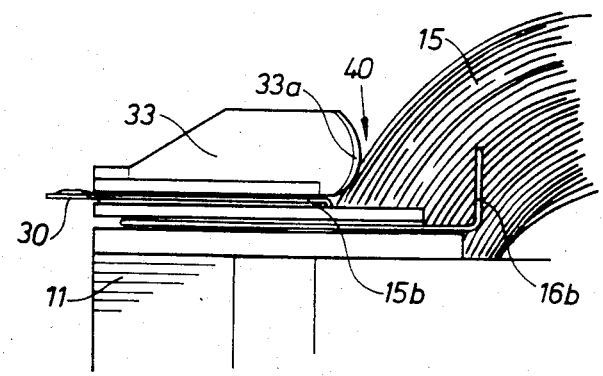

FIGS. 5a–c are detail views on an enlarged scale, showing the resilient tongue and surrounding parts as shown in FIG. 1, with a winding wire end in different positions.

An electric motor, generally referred to by the reference numeral 10, comprises a stator core 11 having two poles 41, 42. In the usual way the core consists of stator laminations which are stacked. The stator core, a first end cap 12, four pins 13 and a second end cap (not shown) together form the frame of the motor 10. The stator lamination packing and the end caps are pushed on the pins 13 and are retained on the pins, for example by means of longitudinal ridges 14 on said pins.

The stator core 11 is provided with two windings 15 and 16 which are supported by a winding holder 17. Each winding in the usual manner is electrically insulated from the stator core by a winding insulation, and has a leading end 15a and 16a, respectively, and a final end 15b and 16b, respectively. On the stator core are also mounted two terminal blocks 18 and 19 which consist of insulating plastic material. For example, the blocks can be provided with pins which are pressed into holes in the stator lamination pack. The terminal block 18 has a groove 18a taking up and guiding the wire end 16b to a holder 20 for an interference suppressor 21. As seen in FIG. 1, the suppressor is provided with terminal pins 22 and 23 to be connected to the mains, and a pin 24 which is connected by a screw 25 to a projection 26, which is part of the end cap 12 and forms a ground connection. The holder 20 is provided with a groove 27 for guiding the wire end 16b to the terminal 22. One of the walls defining the groove 27 has a curved part 28 forming a gentle change-over between the groove 18a and the groove 27. The holder 20 also has a groove 29 for the guidance of the wire end 15a to the terminal pin 23.

Figure 2:
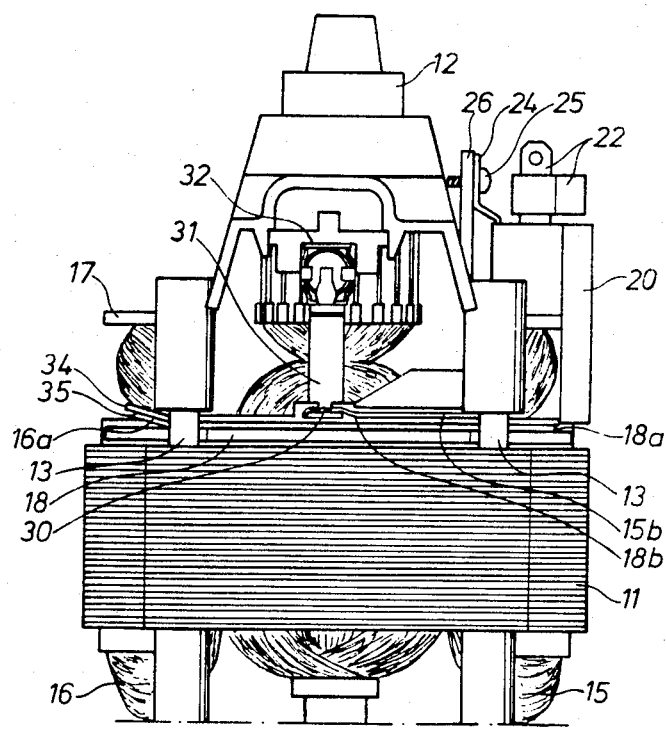
FIG. 2 is a side elevational view thereof.

The terminal block 18 is also provided with a terminal pin 30 to which the wire end 15b is connected. The pin is part of a contact spring 31 (FIG. 2) which extends upwardly and contacts a brush holder 32. The block 18 is provided with a groove 18b (FIG. 2) for the guidance of the wire end 15b and entrance part 18c (FIG. 1) of which being in the form of a slit, and being situated under a resilient tongue 33 of the terminal block. The tongue has gently rounded edges to facilitate insertion of the wire end 15b in the groove 18b. As best shown in FIGS. 5a–5c the tongue 33 is positioned so as to form together with the winding 15 a V-shaped entrance opening 40 to the entrance part 18c of the groove 18b in order to further facilitate the insertion of the wire end. The free end 33a of the tongue 33 is resiliently biased against the winding 15 thereby preventing the wire end being inserted in the entrance part 18c of the groove from loosening and taking an uncontrolled position. In order to facilitate the insertion of the wire end 16b in the groove 18a the terminal block 19 is provided with a lug 34, which together with the underlying part of the terminal block forms a V-shaped groove 35 directed towards the groove 18a.

Figure 3:
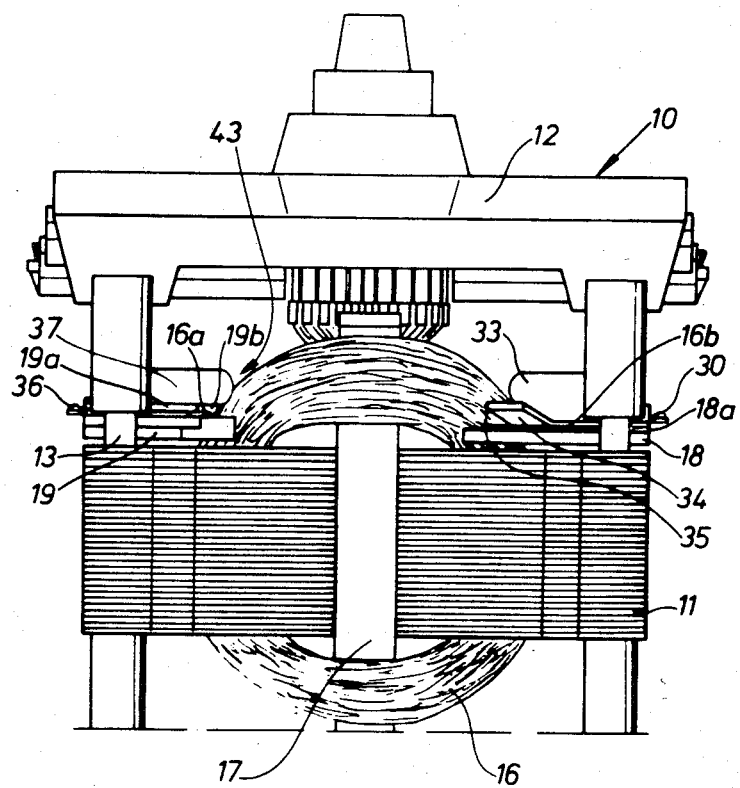
FIG. 3 is a rear elevational view thereof.
Figure 4:
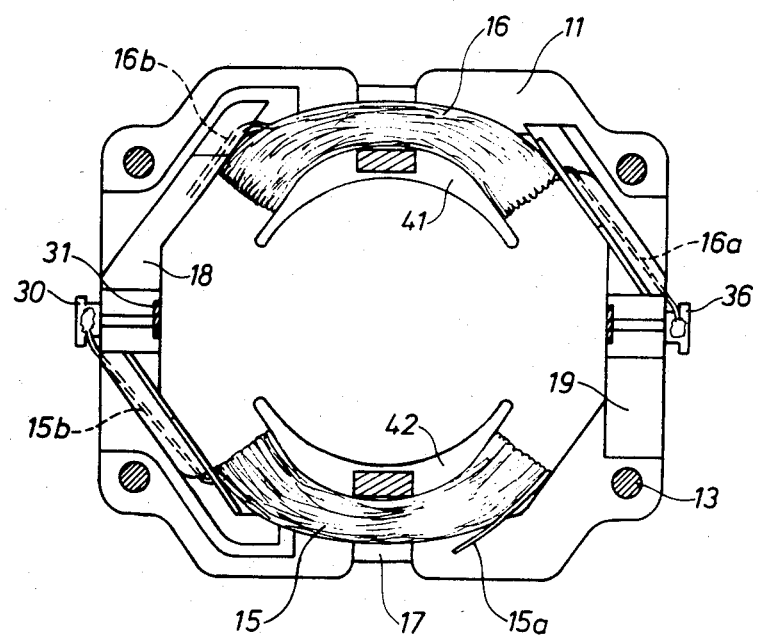
FIG. 4 is a top sectional view, taken along the line IV—IV in FIG. 1.

The terminal block 19, as seen in FIG. 3, has a design similar to that of the terminal block 18. Thus, a groove 19a is provided for the guidance of the wire end 16a to a terminal pin 36. The groove has an entrance part 19b having the shape of a slit and being situated under a resilient tongue 37, which together with the winding 16 form a V-shaped entrance opening 43 similar to the opening 40 shown in FIGS. 5a–c. The grooves 18a, 18b, 19a, 19b, 27 and 29 have a width somewhat exceeding the greatest diameter of the wires used for the windings. For the wires of the windings to be well protected in the grooves the latter are cut to a depth exceeding the diameter of the wire by a factor of two. Any groove corresponding to the groove 18a in the terminal block is not required in the block 19. As appears from FIG. 1 the terminal pin 36 forms part of a contact spring 38, which is resiliently biased against a brush holder 39.

In the manufacture of a motor of the type hereindescribed, the windings 15 and 16 are machine wound directly on the stator core 11. After the completion of the windings, the winding machine transfers the wire ends 15b and 16a to and inserts them in the V-shaped entrance openings 40, 43 formed by the tongues 33 and 37, and the respective windings 15 and 16. During the continued movement performed by the machine the said wire ends are guided downwardly between the respective tongue, which yields, and the cooperating winding, and after which the wire ends are guided around the respective tongue and inserted in the entrance parts 18c and 19b of the grooves 18b and 19a. The wire end 16b is locked by the remaining winding turns and need not be further secured. This applies also to the wire end 15a. When the winding procedure is finished, the stator and the adherent terminal blocks are transferred to another automatic machine transferring the wire ends 15b and 16a through the respective grooves 18b and 19a to the terminal pins 30 and 36, to which the wire ends are secured by welding. Then the holder 20 and the interference suppressor 21 are mounted, and the automatic machine transfers the wire end 16b through the groove 18a into the groove 27, and the wire end 15a directly into the groove 29. Then the wire ends 16b and 15a are drawn by the machine up to the pins 22 and 23, to which the wire ends are connected by welding. Subsequently, the motor is finished in a way known per se.

In the manufacture of small electric rotating machines the invention provides a possibility of recognizing the different wire ends of the windings which later are to be connected to different terminal pins. Moreover, in assembling such machines it will be possible to make use of automatic mounting machines, which may also be used for transferring wire ends to terminals and for connecting said wire ends to the terminals.

What is claimed is:

1. In an electric rotating device having a stator core provided with windings and supporting a terminal block of insulating material on one end thereof, the terminal block having at least one terminal pin, the improvement wherein said terminal block comprises a resilient tongue resiliently biased toward one of said windings to form together with said one of said windings a V-shaped opening, said terminal block further comprising a groove through which a wire end of said winding extends from said opening to said terminal pin.

2. An electric rotating device as claimed in claim 1 wherein said resilient tongue has a free end with rounded edges, said free end being biased against said winding.

3. An electric rotating device as claimed in claim 1 wherein said device is a commutator motor provided with two stator windings and two brushes, brush holders for said brushes, said brush holders being fabricated of electrically conductive material and mounted in said device in an insulating manner, said first mentioned terminal blocks and a second terminal block each guiding a respective wire end of one of said windings to one of said brushes wherein the respective terminal block has a terminal pin constituting one end of a contact spring, the other end of which is biased against said brush holder, said second terminal block also having a tongue resiliently biased against a winding to form a V-shaped entrance opening, and a further groove directing a wire from the winding to its respective terminal pin.

4. An electric rotating device as claimed in claim 3, and comprising an interference suppressor supported by said device, and one of said terminal blocks being provided with a second groove receiving and guiding a leading end of one of said windings to said interference suppressor, said suppressor being located adjacent the other of said windings.

5. An electric rotating device as claimed in claim 4 wherein said second terminal block is provided with two grooves, one of which receives and guides the leading end of the opposite winding, and the other of which receives and guides the leading end of the adjacent winding.

6. An electric rotating device as claimed in claim 5 wherein the groove which is provided in said terminal block and encloses the leading end of the wire of the opposite winding has a direction which intersects the direction of the corresponding groove in said further terminal block, said two grooves having coacting ends which are interconnected by a curved surface of an outer wall of said further terminal block.

7. An electric rotating device as claimed in claim 3 wherein the grooves in said terminal blocks have a depth exceeding by a factor of two the diameter of the wire of said windings.

8. An electric rotating device comprising a stator having first and second winding means, first and second terminal blocks of insulating material held on opposed sides of one axial end of said stator between said first and second windings, each terminal block having a terminal pin and a resilient tongue positioned with respect to a separate one of said windings to define an entrance slot with the respective one of said windings, said entrance slot being V-shaped and extending axially of said device, each said terminal block further having a groove extending circumferentially of said device between the respective entrance slot and terminal pin and guiding a wire from the respective winding to the respective terminal pin.

9. The electric rotating device of claim 8 wherein the tongue of said first terminal block resiliently engages said first winding and the tongue of said second terminal block resiliently engages said second winding.

10. The electric rotating device of claim 9 further comprising an interference suppressor supported adjacent said first winding, said second terminal block having a further groove guiding a second wire from said second winding to said interference suppressor.

11. The electric rotating device of claim 10 further comprising a rotor, means mounting said rotor for rotation in said stator, said rotor having a commutator, stationary brush means engaging said commutator, said brush means extending between said first and second means, and further comprising spring contact means connected to said terminal pins of each of said terminal blocks and resiliently engaging a separate one of said brush means.

12. The electric rotating device of claim 8 wherein said terminal blocks have first portions engaging the end of said stator, said tongues extending transversely of said first portion and stator end.

13. The electric rotating device of claim 12 wherein said grooves of said terminal blocks extend parallel to the plane of said stator end in the outer periphery of said terminal blocks.

14. The electric rotating device of claim 13 wherein said second terminal blocks have a further groove parallel to said stator end and extending substantially completely between said first and second windings.

15. In an electric rotating device having a stator core with a stator winding mounted thereon, and a terminal block of insulating material supported on one axial end of said stator core, and a conductive terminal pin mounted to said terminal block and insulated from said core; the improvement wherein said terminal block comprises a resilient tongue positioned to form an entrance opening with said winding, said entrance opening extending axially of said device and having a dimension increasing axially outwardly of said end, said terminal block further comprising a groove extending circumferentially of said device between said entrance slot and said terminal pin, one wire end of said winding extending in said groove and being connected to said terminal pin, said tongue enabling insertion of said wire end in said groove by axial movement of said wire end in said entrance slot.

16. The electric rotating device of claim 15 wherein said resilient tongue extends to resiliently engage said winding.

17. The device of claim 15 wherein said tongue device and spaced therefrom.

* * * * *